United States Patent [19]

Miller

[11] 4,393,156

[45] Jul. 12, 1983

[54] HYDROLYTICALLY STABLE POLYESTER-CARBONATE COMPOSITIONS

[75] Inventor: Kenneth F. Miller, Mt. Vernon, Ind.

[73] Assignee: General Electric Company, Mt. Vernon, Ind.

[21] Appl. No.: 285,351

[22] Filed: Jul. 20, 1981

[51] Int. Cl.$^3$ .................. C08L 69/00; C08L 83/06
[52] U.S. Cl. ............................ 524/114; 524/107; 524/265; 525/464; 528/27; 528/176; 528/182; 528/194; 528/196
[58] Field of Search ............ 260/29.1 SB, 45.8 AH, 260/348.41; 525/479, 464; 528/27, 176, 182, 194, 196; 524/114, 265, 107

[56] References Cited

U.S. PATENT DOCUMENTS

| | | | |
|---|---|---|---|
| 2,774,690 | 12/1956 | Cockett et al. | 260/29.1 SB |
| 3,057,901 | 10/1962 | Plueddemann | 260/348.41 |
| 3,087,908 | 4/1963 | Caird | 525/464 |
| 3,879,348 | 4/1975 | Serini et al. | 528/196 |
| 4,107,143 | 8/1978 | Inata et al. | 528/196 |
| 4,116,922 | 9/1978 | Hornbaker et al. | 260/29.1 SB |
| 4,138,379 | 2/1979 | Scott et al. | 260/29.1 SB |
| 4,144,202 | 3/1979 | Ashcraft et al. | 260/45.8 AH |
| 4,157,321 | 6/1979 | Kawakami et al. | 260/29.1 SB |
| 4,194,038 | 3/1980 | Baker et al. | 528/194 |
| 4,197,384 | 4/1980 | Bialous et al. | 525/464 |
| 4,197,384 | 4/1980 | Bialous et al. | 260/29.1 SB |
| 4,230,611 | 10/1980 | Mark et al. | 260/29.1 SB |
| 4,243,779 | 1/1981 | McAlister | 525/464 |
| 4,247,448 | 1/1981 | Markezich | 528/196 |
| 4,269,964 | 5/1981 | Freitag et al. | 528/196 |
| 4,335,038 | 6/1982 | Thomas | 524/114 |

*Primary Examiner*—John Kight, III
*Assistant Examiner*—R. A. White
*Attorney, Agent, or Firm*—Martin B. Barancik

[57] ABSTRACT

An improved hydrolytically stable aromatic polyester-carbonate composition comprising in admixture an aromatic polyester-carbonate resin and a hydrolytically stabilizing amount of at least one stabilizing compound selected from epoxy silanes and epoxy siloxanes.

65 Claims, No Drawings

HYDROLYTICALLY STABLE POLYESTER-CARBONATE COMPOSITIONS

BACKGROUND OF THE INVENTION

Polyester-carbonates are well known high molecular weight thermoplastic materials which exhibit many advantageous properties. These properties render the polyester-carbonate resins useful as high performance engineering materials.

However, one of the significant problems associated with the use of polyester-carbonate resins, particularly in high temperature environments, is the tendency of polyester-carbonates to undergo hydrolytic degradation. It is known in the prior art that the addition of certain additives to plastics, such as polycarbonates, results in compositions exhibiting increased resistance to hydrolytic degradation. Examples of such additives are found in U.S. Pat. Nos. 3,839,247; 4,076,686 and 4,138,379. These additives are generally quite useful, and have extended the uses of plastics, such as aromatic polycarbonates, into areas requiring increased levels of hydrolytic stability. However, certain properties of plastics, e.g., polycarbonate resins, can be detrimentally affected by the addition of these additives. Thus, in the case of aromatic polycarbonate resins, the presence of these additives can bring about haze in the polycarbonate article or detrimentally affect the color of the polycarbonate article.

There thus exists a need for polyester-carbonate compositions which exhibit improved hydrolytic stability while at the same time retaining all of the advantageous properties of unmodified polyester-carbonate resins. It is an object of the instant invention to provide such a polyester-carbonate composition.

SUMMARY OF THE INVENTION

In accordance with the present invention there are provided novel high molecular weight aromatic polyester-carbonate compositions which exhibit improved resistance to hydrolytic degradation comprising in admixture aromatic polyester-carbonate resin and a stabilizing amount of at least one hydrolytic stabilizer selected from epoxy silanes, epoxy siloxanes, and mixtures thereof.

DESCRIPTION OF THE INVENTION

It has now been found that polyester-carbonate resin compositions can be obtained whose physical properties permit them to be used in a broader range of applications than was previously possible. This is accomplished by admixing the polyester-carbonate resin with a stabilizing amount of an epoxy compound selected from epoxy silanes, epoxy siloxanes, and mixtures thereof. These stabilized compositions can be utilized in higher temperature and higher moisture environments than heretofore available polyester-carbonate resin compositions.

The preparation of polyester-carbonates which may be employed in the compositions of the present invention is described in U.S. Pat. Nos. 3,030,331; 3,169,121; 3,207,814; 4,194,038 and 4,156,069, as well as in copending application Ser. No. 33,389 filed Apr. 26, 1978 and assigned to the same assignee as the instant application, all of which are incorporated herein by reference.

The polyester-carbonates can generally be described as copolyesters containing carbonate groups, carboxylate groups and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acid such as the acid dihalide, a dihydric phenol and a carbonate precursor.

The dihydric phenols useful in formulating the polyester-carbonates useful in the compositions of the present invention are in general represented by the general formula

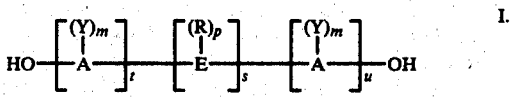

in which A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon containing linkage, or by a sulfur containing linkage such as a sulfide, sulfoxide, sulfone, etc. In addition, E may be a cycloaliphatic group (e.g., cyclopentyl, cyclohexyl, etc.); a sulfur containing linkage such as sulfide, sulfoxide or sulfone; an ether linkage; a carbonyl group; a tertiary nitrogen group or a silicon containing linkage such as a silane or a siloxy group. The symbol R in Formula I represents hydrogen or a monovalent hydrocarbon group such as alkyl (e.g., methyl, ethyl, propyl, etc.). aryl (e.g., phenyl, naphthyl, etc.), aralkyl (e.g., benzyl, ethylphenyl, etc.), alkaryl, or a cycloaliphartic group (e.g., cyclopentyl, cyclohexyl, etc.). Y may be an inorganic atom such as a halogen (fluorine, chlorine, bromine, iodine), an inorganic group such as the nitro group, an organic group such as R above, or an oxy group such as OR, it being only necessary that Y be inert to and unaffected by the reactants and the reaction conditions. The letter m represents any integer from and including zero through the number of positions on A available for substitution; p represents an integer from and including zero through the number of positions on E available for substitution; t represents an integer equal to at least one; s is either zero or one; and u represents an integer including zero.

In the dihydric phenol compound represented by Formula I above, when more than one Y substituent is present, they may be the same or different. The same holds true for the R substituent. Where s is zero in Formula I and u is not zero, the aromatic rings are joined with no intervening alkylene or other bridge. The positions of the hydroxyl groups and Y on the aromatic nuclear residues A can be varied in the ortho, meta or para positions and the groupings can be in a vicinal, asymmetrical or symmetrical relationship, where two or more ring carbon atoms of the aromatic hydrocarbon residue are substituted with Y and a hydroxyl group.

Some nonlimiting examples of compounds falling within the scope of Formula I include:

2,2-bis(4-hydroxyphenyl)propane (bisp ˋl A);

2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis(4-hydroxyphenyl)cyclomethane; and
2,2-bis(4-hydroxyphenyl)-1-phenylpropane.

These dihydric phenols may be used individually or as mixtures of two or more different dihydric phenols.

In general any difunctional carboxylic acid, or its reactive derivative such as the acid dihalide, conventionally used in the preparation of polyesters may be used for the preparation of polyester-carbonates useful in formulating the compositions of the present invention. In general the carboxylic acids which may be used include the aliphatic carboxylic acids, aliphatic-aromatic carboxylic acids, or aromatic carboxylic acids. The aromatic dicarboxylic acids or their reactive derivatives such as the aromatic diacid halides are preferred as they produce the aromatic polyestercarbonates which are most useful, from the standpoint of physical properties, in the practice of the instant invention.

These carboxylic acids may be represented by the general formula

$$R^2 \dashv R^1 \dashv_q COOH \qquad \text{II.}$$

wherein $R^1$ represents an alkylene, alkylidene or cycloaliphatic group in the same manner as set out above for E in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula I; or a divalent aliphatic-aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid dihalides, are preferred. Thus in these preferred aromatic dicarboxylic acids, as represented by Formula II, $R^2$ is a carboxyl group and $R^1$ is an aromatic radical such as phenylene, biphenylene, naphthylene, substituted phenylene, etc.; two or more aromatic groups connected through non-aromatic linkages; or a divalent aliphatic-aromatic radical. Some nonlimiting examples of suitable preferred aromatic dicarboxylic acids which may be used in preparing the polyester-carbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid.

These acids may be used individually or as mixtures of two or more different acids.

The carbonate precursor may be either a carbonyl halide, a carbonate ester, or a haloformate. The carbonyl halides which can be employed herein are carbonyl chloride and carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc, di(alkylphenyl)carbonates such as di(tolyl)carbonate, etc., di(naphthyl)carbonate, di(chloronaphthyl)carbonate, phenyltolyl carbonate, chloronaphthyl chlorophenyl carbonate, and the like. The haloformates suitable for use herein include bis-haloformates of dihydric phenols such as bis-chloroformates of hydroquinone, etc. or glycols such as bis-haloformates of ethylene glycol, neopentyl glycol, polyethylene glycol, etc. While other carbonate precursor will occur to those skilled in the art, carbonyl chloride, also known as phosgene, is preferred.

The polyester-carbonates which are useful in the practice of the present invention include the aromatic polyester-carbonates derived from dihydric phenols, aromatic dicarboxylic acids or their reactive derivatives such as the aromatic diacid halides, and phosgene. A quite useful class of aromatic polyester-carbonates is that derived from bisphenol A; isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride; and phosgene. When a mixture of isophthalic acid and terephthalic acid or isophthaloyl dichloride and terephthaloyl dichloride is used the mixture contains these two components in a ratio, by weight, of from 5:95 to 95:5.

The polyester-carbonate compositions of the instant invention are formulated by admixing the particular epoxy compound described hereinafter with the polyester carbonate resin. The epoxy compound may be used individually or as a mixture of two or more different epoxy compounds. The epoxy stabilizing compound is selected from the group consisting of epoxy silanes and epoxy siloxanes.

The epoxy silanes useful as hydrolytic stabilizers in the compositions of the present invention are compounds represented by the general formula $$Z_n Si(R^3)_{4-n} \qquad \text{III}$$

wherein n is an integer having a value of from 1 to 3 inclusive. In Formula III $R^3$ is independently selected from hydrogen; alkyl radicals; substituted alkyl radicals; cycloalkyl radicals; alkenyl radicals; aryl radicals; aralkyl radicals; alkaryl radicals; divalent organic radicals which together with the Si atom form a cyclic structure, such organic radicals being selected from divalent saturated aliphatic hydrocarbon radicals and divalent saturated organic radicals containing carbon and oxygen atoms in the ring structure, with the proviso that if one of $R^3$ is such a divalent organic radical then n has a value of 1 or 2 and the total valence of silicon is four; $OR^4$ radicals wherein $R^4$ is selected from hydrogen, alkyl radicals, substituted alkyl radicals, alkenyl radicals, aryl radicals, aralkyl radicals, and alkaryl radicals; $-R^5OR^4$ radicals wherein $R^5$ is a divalent saturated aliphatic hydrocarbon radical or a divalent aromatic hydrocarbon radical; $-OOCR^4$ radicals; $-COOR^4$ radicals; $-R^5COOR^4$ radicals; $-R^5OOCR^4$ radicals; and polyether radicals of the general formula $-R^6-(-O-R^7-)_a-O-R^8$ wherein a is an integer having a value of from 1 to 4 inclusive, $R^6$ and $R^7$ are independently selected from divalent saturated aliphatic hydrocarbon radicals, and $R^8$ is an alkyl radical.

Preferably $R^3$ is selected from hydrogen; hydroxyl; alkyl radicals; alkoxy radicals; aryl radicals; aryloxy radicals; alkaryl radicals; and aralkyl radicals.

In Formula III preferred alkyl and substituted alkyl radicals represented by $R^3$ and $R^4$ are those containing from 1 to about 24 carbon atoms. Preferred cycloalkyl radicals represented by $R^3$ are those containing from 4 to about 24 carbon atoms. Preferred alkenyl radicals represented by $R^3$ and $R^4$ are those containing from 2 to about 24 carbon atoms. Preferred aryl radicals represented by $R^3$ and $R^4$ are those containing from 6 to 24 carbon atoms. Preferred alkaryl and aralkyl radicals represented by $R^3$ and $R^4$ are those containing from 7 to about 24 carbon atoms. Preferred divalent saturated aliphatic hydrocarbon radicals which together with the Si atom form a cyclic structure, as represented by $R^3$, are those containing from 2 to about 24 carbon atoms; while preferred divalent saturated organic radicals containing carbon and oxygen atoms in the ring structure are those containing from 2 to about 24 carbon atoms and from 1 to about 6 oxygen atoms. Preferred divalent saturated aliphatic hydrocarbon radicals represented by $R^5$, $R^6$ and $R^7$ are those containing from 1 to about 12 carbon atoms. Preferred alkyl radicals represented by $R^8$ are those containing from 1 to about 12 carbon atoms.

In Formula III Z represents a monovalent epoxy group selected from the class consisting of monovalent derivatives of epoxy ethane and the monovalent derivatives of epoxy cyclohexane.

The monovalent derivatives of epoxy ethane are represented by the general formula

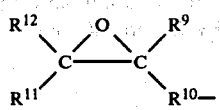  IV.

wherein:

(i) $R^9$, $R^{10}$, $R^{11}$ and $R^{12}$ are independently selected from hydrogen; alkyl radicals; substituted alkyl radicals; cycloalkyl radicals; alkenyl radicals; aryl radicals; aralkyl radicals; alkaryl radicals; $OR^{13}$ radicals wherein $R^{13}$ is selected from the class consisting of hydrogen, alkyl radicals, substituted alkyl radicals, alkenyl radicals, aryl radicals, alkaryl radicals, and aralkyl radicals; —$R^{14}OR^{13}$ radicals wherein $R^{14}$ is a divalent saturated aliphatic hydrocarbon radical or a divalent aromatic hydrocarbon radical; —$OOCR^{13}$ radicals; —$COOR^{13}$ radicals; —$R^{14}OOCR^{13}$ radicals; —$R^{14}COOR^{13}$ radicals; —$OR^{15}$ radicals wherein $R^{15}$ is selected from the group consisting of oxirane ring containing monovalent saturated aliphatic hydrocarbon radicals and oxirane ring containing monovalent aliphatic-aromatic hydrocarbon radicals; —$R^{14}OR^{15}$ radicals; —$OOCR^{15}$ radicals; —$COOR^{15}$ radicals; —$R^{14}OOCR^{15}$ radicals; and —$R^{14}COOR^{15}$ radicals; with the proviso that (ii) one of $R^9$, $R^{10}$, $R^{11}$ or $R^{12}$ is selected from the class consisting of divalent saturated aliphatic hydrocarbon radicals; divalent aromatic hydrocarbon radicals; —$OR^{16}$— radicals wherein $R^{16}$ is a divalent saturated aliphatic hydrocarbon radical or a divalent aromatic hydrocarbon radical; —$R^{14}OR^{16}$— radicals; —$OOCR^{16}$— radicals; —$COOR^{16}$— radicals; —$R^{14}OOCR^{16}$— radicals; and —$R^{14}COOR^{16}$— radicals.

Preferred derivatives of epoxy ethane represented by Formula IV are those wherein:

(i) $R^9$ through $R^{12}$ are independently selected from the class consisting of hydrogen; alkyl radicals; substituted alkyl radicals; cycloalkyl radicals; aryl radicals; aralkyl radicals; alkaryl radicals; and $OR^{17}$ radicals wherein $R^{17}$ is selected from the class consisting of hydrogen, alkyl radicals, substituted alkyl radicals, aryl radicals, alkaryl radicals, and aralkyl radicals; with the proviso that (ii) one of $R^9$, $R^{10}$, $R^{11}$ or $R^{12}$ is selected from the class consisting of divalent saturated aliphatic hydrocarbon radicals; divalent aromatic hydrocarbon radicals; $OR^{16}$— radicals; and —$R^{14}OR^{16}$— radicals.

While in Formula IV $R^{10}$ is shown as falling within the definition of (ii) and being bonded to the silicon atom, this is merely done for the sake of convenience, clarity and illustration, and it is to be understood that any one of $R^9$ through $R^{12}$ can fall within the definition of (ii) and be bonded to the silicon atom.

In Formula IV preferred alkyl and substituted alkyl radicals represented by $R^9$—$R^{13}$ and $R^{17}$ are those containing from 1 to about 24 carbon atoms. Preferred cycloalkyl radicals represented by $R^9$—$R^{12}$ are those containing from 4 to about 24 carbon atoms. Preferred alkenyl radicals represented by $R^9$—$R^{13}$ are those containing from 2 to about 24 carbon atoms. Preferred aryl radicals represented by $R^9$—$R^{13}$ and $R^{17}$ are those containing from 6 to 24 carbon atoms. Preferred alkaryl and aralkyl radicals represented by $R^9$—$R^{13}$ and $R^{17}$ are those containing from 7 to about 24 carbon atoms. Preferred divalent saturated aliphatic hydrocarbon radicals represented by $R^{14}$ and $R^{16}$ are those containing from 1 to about 12 carbon atoms. Preferred divalent aromatic hydrocarbon radicals represented by $R^{14}$ and $R^{16}$ are those containing from 6 to about 24 carbon atoms. Preferred oxirane ring containing monovalent saturated aliphatic hydrocarbon radicals represented by $R^{15}$ are those containing from 2 to about 24 carbon atoms, while preferred oxirane ring containing monovalent aliphatic-aromatic hydrocarbon radicals represented by $R^{15}$ are those containing from 8 to about 24 carbon atoms.

The derivatives of epoxy cyclohexane are represented by the general formula

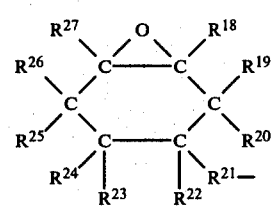  V.

wherein:

(a) $R^{18}$ through $R^{27}$ are independently selected from hydrogen; alkyl radicals; substituted alkyl radicals; alkenyl radicals; aryl radicals; aralkyl radicals; alkaryl radicals; $OR^{29}$ radicals wherein $R^{29}$ is selected from hydrogen, alkyl radicals, substituted alkyl radicals, alkenyl radicals, aryl radicals, alkaryl radicals, and aralkyl radicals; —$R^{30}OR^{29}$ radicals wherein $R^{30}$ is selected from divalent saturated aliphatic hydrocarbon radicals and divalent aromatic hydrocarbon radicals; —$COOR^{29}$ radicals; —$OOCR^{29}$ radicals; —$R^{30}COOR^{29}$ radicals; $OR^{31}$ radicals wherein $R^{31}$ is selected from oxirane ring containing saturated aliphatic hydrocarbon radicals and oxirane ring containing aliphatic-aromatic hydrocarbon radicals; —$R^{30}OR^{31}$ radicals; —$OOCR^{31}$ radicals;

—COOR³¹ radicals; —R³⁰OOCR³¹ radicals; and —R³-OCOOR³¹ radicals; with the proviso that (b) one of R¹⁸ through R²⁷ is selected from the class of divalent saturated aliphatic hydrocarbon radicals; divalent aromatic hydrocarbon radicals; —OR³²— radicals wherein R³² is selected from divalent saturated aliphatic hydrocarbon radicals and divalent aromatic hydrocarbon radicals; —R³⁰OR³²— radicals; —OOCR³²— radicals; —COOR³²— radicals; —R³⁰OOCR³²— radicals; and —R³⁰COOR³²— radicals.

Preferred derivatives of epoxycyclohexane represented by Formula V are those wherein:

(a) R¹⁸ through R²⁷ are independently selected from the class consisting of hydrogen; alkyl radicals; substituted alkyl radicals; aryl radicals; alkaryl radicals; aralkyl radicals; and OR²⁸ radicals wherein R²⁸ is selected from hydrogen, alkyl radicals, substituted alkyl radicals, aryl radicals, alkaryl radicals, and aralkyl radicals; with the proviso that (b) one of R¹⁸ through R²⁷ is selected from the class consisting of divalent saturated aliphatic hydrocarbon radicals; divalent aromatic hydrocarbon radicals; —OR³²— radicals; and —R³⁰OR³²— radicals.

While in Formula V R²¹ is shown as falling within the definition of (b) and being bonded to the silicon atom this is done merely for the sake of convenience, clarity and illustration, and it is to be understood that any one of R¹⁸ through R²⁷ can fall within the definition of (b) and be bonded to the silicon atom.

In Formula V preferred alkyl radicals represented by R¹⁸ through R²⁷, R²⁸ and R²⁹ are those containing from 1 to about 24 carbon atoms. Preferred substituted alkyl radicals represented by R¹⁸ through R²⁷, R²⁸ and R²⁹ are those containing from 1 to about 24 carbon atoms. Preferred alkenyl radicals represented by R¹⁸ through R²⁷ and R²⁹ are those containing from 2 to about 24 carbon atoms. Preferred aryl radicals represented by R¹⁸ through R²⁷, R²⁸ and R²⁹ are those containing from 6 to about 24 carbon atoms. Preferred aralkyl radicals represented by R¹⁸ through R²⁷, R²⁸ and R²⁹ are those containing from 7 to about 24 carbon atoms. Preferred alkaryl radicals represented by R¹⁸ through R²⁷, R²⁸ and R²⁹ are those containing from 7 to about 24 carbon atoms. Preferred divalent saturated aliphatic hydrocarbon radicals represented by R³⁰ and R³² are those containing from 1 to about 12 carbon atoms. Preferred divalent aromatic hydrocarbon radicals represented by R³⁰ and R³² are those containing from 6 to about 24 carbon atoms. Preferred oxirane ring containing saturated aliphatic hydrocarbon radicals represented by R³¹ are those containing from 2 to about 24 carbon atoms. Preferred oxirane ring containing aliphatic-aromatic hydrocarbon radicals represented by R³¹ are those containing from 8 to about 24 carbon atoms.

Some nonlimiting illustrative examples of substituted alkyl radicals are those containing one or more inorganic substituent groups such as hydroxyl and/or halides (chlorine, fluorine, bromine and iodine).

Some nonlimiting illustrative examples of divalent organic radicals containing carbon and oxygen atoms in the ring structure which together with the silicon atom form a cyclic structure as represented by R³ in Formula III include —CH₂—O—CH₂—, —C₂H₄—O—C₂H₄—O—C₂H₄—, —O—C₃H₆, —O—C₃H₆—O—CH₂—, —CH₂—O—C₄H₈—O—CH₂—, and the like. Preferably these compounds are the divalent saturated aliphatic organic radicals containing from 2 to about 24 carbon atoms and from 1 to about 6 oxygen atoms.

Some nonlimiting illustrative examples of divalent saturated aliphatic hydrocarbon radicals represented by R⁵, R¹⁴, R¹⁶, R³⁰ and R³² include —CH₂CH₂—,

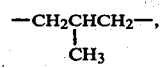

—CH₂CH₂CH₂CH₂—, and the like. Some nonlimiting illustrative examples of divalent aromatic hydrocarbon radicals represented by R⁵, R¹⁴, R¹⁶, R³⁰ and R³² include

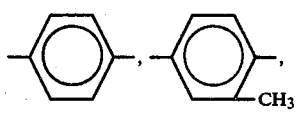

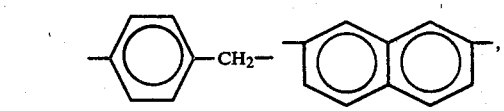

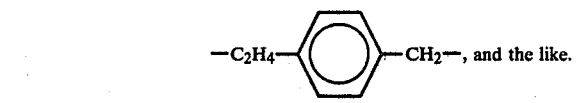

Some nonlimiting illustrative examples of oxirane ring containing monovalent saturated aliphatic hydrocarbon radicals represented by R¹⁵ and R³¹ include

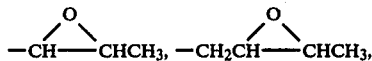

and the like.

Some nonlimiting illustrative examples of oxirane ring containing aliphatic-aromatic radicals represented by R¹⁵ and R³¹ include:

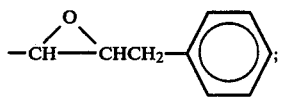

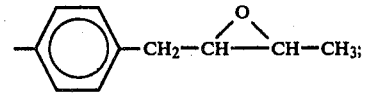

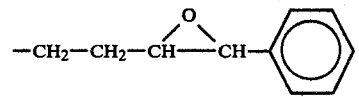

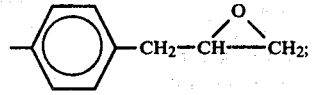

-continued

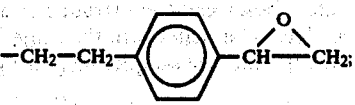

When Z in Formula III represents a monovalent derivative of epoxy ethane as represented by Formula IV, Formula III becomes

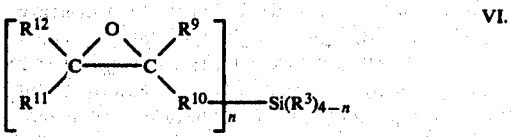

VI.

When Z in Formula III represents a monovalent derivative of epoxy cyclohexane as represented by Formula V, Formula III becomes

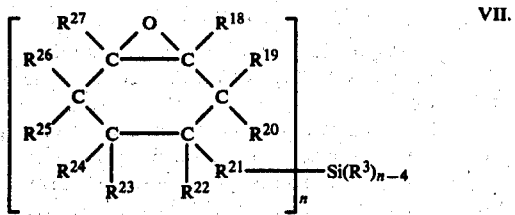

VII.

While in Formula VI $R^{10}$ is depicted as being bonded to the silicon atom it is to be understood that bonding to the silicon atom can occur through any one of $R^9$ through $R^{12}$. So also in Formula VII where $R^{21}$ is depicted as being bonded to the silicon atoms it is to be understood that bonding can occur through any one of $R^{18}$ through $R^{27}$.

The epoxy silanes of Formulae VI and VII are compounds well known to those skilled in the art and are generally commercially available, or can be prepared by known methods.

Some nonlimiting illustrative examples of compounds represented by Formulae VI and VII, as well as epoxy siloxanes of Formula VIII, are set forth in Table I.

The epoxy siloxane compounds useful as stabilizers in the polyester-carbonate compositions of the instant invention are represented by the general formula

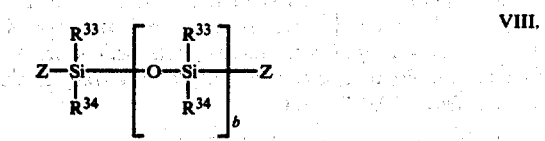

VIII.

wherein b is an integer having a value from 1 to about 10; $R^{33}$ and $R^{34}$ are independently selected from alkyl radicals of from 1 to about 24 carbon atoms, alkenyl radicals of from 2 to about 24 carbon atoms, aryl radicals of from 6 to 24 carbon atoms, aralkyl radicals of from 7 to about 24 carbon atoms, alkaryl radicals containing from 7 to about 24 carbon atoms, hydrogen, alkoxy radicals containing from 1 to about 24 carbon atoms, and aryloxy radicals containing from 6 to 24 carbon atoms; and each Z is independently selected from the monovalent epoxy radicals represented by Formulae IV and V.

In Formula VIII both Zs can be the same or they may be different. Thus, for example, one Z may be an epoxy radical represented by Formula IV while the other Z may be an epoxy radical represented by Formula V; one Z may be one epoxy radical represented by Formula IV while the other Z is a different epoxy radical represented by Formula IV; or one Z may be an epoxy radical represented by Formula V while the other Z is a different epoxy radical represented by Formula V.

TABLE I beta(3,4-epoxycyclohexyl)ethyl-trimethoxy silane;
2,2,3,3,4,4-hexamethyl-5,6-epoxycyclohexylmethyl trivinyl silane;
1-(beta-3,4-epoxycyclohexyl)ethyl-1-methyl-1-sila-2-oxa-cyclohexane;
gamma(glycidoxypropyl)trimethoxy silane;
gamma(glycidoxypropyl)ethoxy silane;
p-glycidoxyphenyl-dicyclohexyl acetoxy silane;
bis(3-glycidoxypropyl)tetramethyl disiloxane;
1,8-di(beta-3,4-epoxycyclohexyl)ethyl-octadiphenyl-siloxane; and
1,3-di(2,3-epoxypropane)hexaethoxy trisiloxane.

The polyester-carbonate compositions of the instant invention may contain only one of the aforedescribed epoxy hydrolytic stabilizers or they may contain a mixture of two or more of these stabilizers. Thus, for example, the polyester-carbonate compositions of the instant invention may contain two different epoxy stabilizers of Formula VI; two different stabilizers of Formula VII; two different stabilizers of Formula VIII; one epoxy stabilizer of Formula VII and one epoxy stabilizer of Formula VI; one epoxy stabilizer of Formula VI and one epoxy stabilizer of Formula VIII; or one epoxy stabilizer of Formula VII and one epoxy stabilizer of Formula VIII.

The amount of epoxy stabilizer present in the polyester-carbonate compositions of the instant invention is a hydrolytically stabilizing amount. By hydrolytically stabilizing amount is meant an amount of stabilizing compound effective to stabilize the polyester-carbonate resin against hydrolytic degradation. Generally this amount is from about 0.005 to about 4.0 weight percent, based on the weight of the polyester-carbonate resin present in the composition. Preferably this amount ranges from about 0.01 to about 2 weight percent, and more preferably from about 0.02 to about 0.5 weight percent.

The polyester-carbonate resin compositions of the present invention are formulated by adding the epoxy stabilizing compounds described above to the polyester-carbonate resin and mixing or blending the stabilizer and resin by generally mechanical means such as stirring, blending in a mechanical blender, and the like to form the compositions of the instant invention.

The compositions of the instant invention may optionally contain other commonly known and used additives such as antistatic agents, antioxidants, ultraviolet radiation absorbers, mold release agents, colorants, fillers such as glass fibers, graphite fibers, etc, impact modifiers, color stabilizers, flame retardants, and the like. Some nonlimiting illustrative examples of suitable ultraviolet radiation absorbers include the benzophenones and the benzotriazoles. Some nonlimiting illustrative examples of suitable color stabilizers include the organophosphites. Some of these organophosphites are disclosed in U.S. Pat. Nos. 4,138,379; 4,118,370 and 3,305,520, all of which are incorporated herein by reference. Some useful flame retardants are those disclosed in U.S. Pat. Nos. 3,915,926; 4,197,232 and the organic alkali metal salts and organic alkaline earth metal salts of sulfonic acid as described in U.S. Pat. Nos. 3,933,734; 3,948,851; 3,926,968; 3,919,167; 3,909,490; 3,953,396: 3,931,100; 3,978,024; 3,953,399; 3,917,559; 3,951,910 and 3,940,366, all of which are incorporated herein by reference.

As mentioned previously the compositions of the instant invention may contain color stabilizers. The preferred color stabilizers are the organophosphites. These organophosphites and their color stabilizing properties are known to those skilled in the art, and are disclosed, for example, in U.S. Pat. Nos. 3,305,520; 4,138,379; 4,118,370 and 4,102,859, all of which are incorporated herein by reference. Generally, absent the color stabilizers the color of the aromatic polyester-carbonate molded articles tends to deteriorate when exposed to high temperatures such as those existant during processing or in applications associated with high temperature environments. Sometimes this color deterioration is so severe that these aromatic polyester-carbonate articles become commercially unacceptable. The addition of the organophosphite color stabilizers to the polyester-carbonate resins generally remedies this problem of color deterioration. However, these organophosphite color stabilizers generally tend to adversely affect the hydrolytic stability of the aromatic polyester-carbonate resin. Thus, in the case where organophosphite color stabilizers are present in the aromatic polyester-carbonate compositions it is even more essential to stabilize these compositions against hydrolytic degradation than in the case of aromatic polyester-carbonate compositions containing no organophosphite color stabilizers.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates a control composition, falling outside the scope of the instant invention, which is comprised of a polyester-carbonate resin derived from bisphenol A, a mixture of terephthaloyl dichloride and isophthaloyl dichloride, and phosgene.

The resin of this example is prepared by adding to a reactor vessel 16 liters of methylene chloride, 8 liters of water, 1906 grams (8.36 moles) of bisphenol A, 24 milliliters of triethylamine, 3.4 grams of sodium gluconate, and 65 grams of para-tertiary-butylphenol chain terminator. At a pH of between about 9–10.5, 1089.6 grams (5.37 moles) of a mixture of 15% by weight of isophthaloyl dischloride and 85% by weight of terephthaloyl dichloride in 2 liters of methylene chloride are added over a 10 minute interval while controlling the pH at about 9–10.5 with 35% aqueous caustic. After the addition of the diacid chloride mixture, phosgene is added at a rate of 36 grams per minute for 12 minutes while controlling the pH at about 10–11 with 35% aqueous caustic. The polymer mixture is diluted with 2 liters of methylene chloride and the brine phase is separated. The resulting polymer phase is washed once with 0.1 N HCl and three times with water and is then recovered by high steam precipitation to yield a white powder. This resin product is then fed to an extruder operating at a temperature of about 600° F. to extrude the resin into strands and the extruded strands are chopped into pellets. The pellets are then injection molded at about 650° F. into test samples measuring about 2"×2"×0.1".

EXAMPLE 2

This example illustrates a hydrolytically stabilized polyester-carbonate composition falling within the scope of the present invention.

To the powdered polyester-carbonate resin prepared substantially in accordance with the procedure of Example 1 is added gamma-glycidoxypropyl-trimethoxysilane in an amount of 0.1 parts by weight per hundred parts by weight or resin. The resin and the stabilizer are thoroughly mixed and the mixture is then fed into an extruder operating at a temperature of about 600° F. to extrude the composition into strands and the extruded strands are chopped into pellets. The pellets are then injection molded at about 650° F. into test samples measuring about 3"×2"×0.1".

EXAMPLE 3

This example illustrates a stabilized polyester-carbonate composition falling within the scope of the instant invention.

To the powdered polyester-carbonate resin prepared substantially in accordance with the procedure of Example 1 is added beta(3,4-epoxycyclohexyl)ethyl-trimethoxy-silane in an amount of 0.1 parts by weight per hundred parts by weight of resin. The resin and the stabilizer are thoroughly mixed and the mixture is then fed to an extruder operating at a temperature of about 600° F. to extrude the composition into strands, and the strands are chopped into pellets. The pellets are then injection molded at about 650° F. into test samples measuring about 3"×2"×0.1".

EXAMPLE 4

This example illustrates yet another hydrolytically stabilized polyester-carbonate composition of the present invention.

To the powdered polyester-carbonate resin prepared substantially in accordance with the procedure of Example 1 is added 0.1 parts by weight per hundred parts by weight of resin of bis(3-glycidoxypropyl) tetramethyldisiloxane stabilizer. The resin and the stabilizer are thoroughly mixed and the mixture is fed into an extruder operating at a temperature of about 600° F. to extrude the mixture into strands, and the extruded strands are chopped into pellets. The pellets are then injection molded at about 650° F. into test samples measuring about 3"×2"×0.1".

EXAMPLE 5

This example illustrates a color stabilized but hydrolytically unstabilized polyester-carbonate composition falling outside the scope of the instant invention.

To the powdered polyester-carbonate resin prepared substantially in accordance with the procedure of Example 1 is added 0.03 parts by weight per hundred parts by weight of resin bis(2,4-ditertiarybutylphenyl)pentaerythritol diphosphite color stabilizer. The resin and the color stabilizer are thoroughly mixed and the mixture is fed to an extruder operating at a temperature of about 600° F. to extrude the mixture into strands, and the extruded strands are chopped into pellets. The pellets are then injection molded at about 650° F. into test samples measuring about 3"×2"×0.1".

EXAMPLE 6

This example illustrates a color stabilized and hydrolytically stabilized polyester-carbonate composition falling within the scope of the present invention.

To the powdered polyester-carbonate resin prepared substantially in accordance with the procedure of Example 1 are added 0.1 parts by weight per hundred parts by weight of resin of gamma-glycidoxypropyltrimethoxy silane hydrolytic stabilizer and 0.03 parts by weight per hundred parts by weight of resin of bis(2,4-ditertiarybutylphenyl)pentaerythritol diphosphite color stabilizer. The resin and the stabilizers are thoroughly mixed and the mixture is fed to an extruder operating at a temperature of about 600° F. to extrude the composition into strands and the extruded strands are chopped into pellets. The pellets are then injection molded at about 650° F. into test samples measuring about 3"×2"×0.1".

EXAMPLE 7

This example illustrates another color stabilized and hydrolytically stabilized aromatic polyester-carbonate composition of the instant invention.

To the powdered polyester-carbonate resin prepared substantially in accordance with the procedure of Example 1 are added 0.1 parts by weight per hundred parts by weight of resin of beta(3,4-epoxycyclohexyl)ethyltrimethoxy silane hydrolytic stabilizer and 0.03 parts by weight per hundred parts of resin of bis(2,4-ditertiarybutylphenyl)pentaerythritol diphosphite color stabilizer. The resin and the stabilizers are thoroughly mixed and the mixture is fed to an extruder operating at a temperature of about 600° F. to extrude the mixture into strands, and the extruded strands are chopped into pellets. The pellets are injection molded at about 650° F. into test samples measuring about 3"×2"×0.1".

EXAMPLE 8

This example illustrates yet another color stabilized and hydrolytically stabilized aromatic polyester-carbonate composition of the instant invention.

To the powdered polyester-carbonate resin prepared substantially in accordance with the procedure of Example 1 there are added 0.1 parts by weight per hundred parts by weight of resin of bis(3-glycidoxypropyl)-tetramethyldisiloxane hydrolytic stabilizer and 0.03 parts by weight per hundred parts by weight of resin of bis(2,4-ditertiarybutylphenyl)pentaerythritol color stabilizer. The resin and the stabilizers are thoroughly mixed and the mixture is fed to an extruder operating at a temperature of about 600° F. to extrude the mixture into strands, and the extruded strands are chopped into pellets. The pellets are then injection molded at about 650° F. into test samples measuring about 3"×2"×0.1".

Each of the samples of Examples 1–8 is subjected to ASTM Yellowness Index (YI) Test D 1925. Each of the samples of Examples 1–8 is also subjected to ASTM test method D 1003 for determining light transmission on the samples before and after steam autoclaving at 250° F. The higher the percent of light transmitted the better the clarity of the sample, and thus the lower the degree of hydrolytic degradation of the sample. Conversely, the lower the percent of light transmitted the lesser the clarity of the sample, and thus the greater the degree of hydrolytic degradation of the sample. The results of these tests are set forth in Table II.

Each of the samples of Examples 1–8 is measured for molecular weight degradation, caused by hydrolysis, by measuring the intrinsic viscosity before and after steam autoclaving at 250° F. The greater the change in the intrinsic viscosity the greater the degradation of the polyester-carbonate by hydrolysis. The results of this test is set forth in Table III.

TABLE II

| EXAMPLE No. | YI | % Light Transmitted Before Autoclaving | % Light Transmitted After Autoclaving (Time in Hours) | |
|---|---|---|---|---|
| | | | 72 | 144 |
| 1 | 27.1 | 83 | 62 | 44 |
| 2 | 20.5 | 85 | 79 | 69 |
| 3 | 25.3 | 85 | 80 | 76 |
| 4 | 23.5 | 84 | 79 | 75 |
| 5 | 17.7 | 87 | 74 | 4 |
| 6 | 16.8 | 86 | 82 | 76 |
| 7 | 14.1 | 87 | 82 | 78 |
| 8 | 15.5 | 86 | 81 | 75 |

TABLE III

| EXAMPLE NO. | Intrinsic viscosity Before Autoclaving | Intrinsic Viscosity After Autoclaving (Time in Hours) | |
|---|---|---|---|
| | | 72 | 144 |
| 1 | 0.507 | 0.427 | 0.343 |
| 2 | 0.514 | 0.471 | 0.421 |
| 3 | 0.506 | 0.472 | 0.432 |
| 4 | 0.517 | 0.497 | 0.475 |
| 5 | 0.515 | 0.362 | 0.204 |
| 6 | 0.519 | 0.484 | 0.427 |
| 7 | 0.518 | 0.486 | 0.454 |
| 8 | 0.520 | 0.473 | 0.387 |

The data in tables II and III clearly demonstrate the effect autoclaving has on the aromatic polyester-carbonate tests samples with and without the particular epoxy hydrolytic stabilizer additives of the instant invention. It is clear from this data that the test samples molded from polyester-carbonate compositions containing the epoxy hydrolytic stabilizers of the instant invention, i.e., Examples 2–4 and 6–8, are hydrolytically more stable than test samples molded from polyester-carbonate resin containing no hydrolytic stabilizers, i.e. Examples 1 and 5. This difference in hydrolytic stability is particularly striking when organophosphite color stabilizers are used with the aromatic polyester-carbonate resin, i.e., Examples 5–8.

It will thus be seen that the objects set forth above among those made apparent from the preceding description are efficiently attained, and since certain changes may be made in the processes and compositions described above without departing from the scope of the invention, it is intended that all matters contained in the above description shall be interpreted as illustrative rather than limiting.

What is claimed is:

1. An aromatic polyester-carbonate composition having improved hydrolytic stability comprising in admixture an aromatic polyester-carbonate resin and a stabilizing amount of at least one hydrolytic stabilizer selected from the class consisting of epoxy silanes and epoxy siloxanes.

2. The composition of claim 1 wherein said stabilizer is present in an amount of from about 0.005 to about 4 weight percent based on the weight of the aromatic polyester-carbonate resin.

3. The composition of claim 2 wherein said epoxy silanes are represented by the general formula $$Z_nSi(R^3)_{4-n}$$

wherein n is an integer from 1 to 3 inclusive; Z is a monovalent epoxy radical; and $R^3$ is independently selected from hydrogen; alkyl radicals; substituted alkyl radicals; cycloalkyl radicals; alkenyl radicals; aryl radicals; alkaryl radicals; aralkyl radicals; divalent organic radicals which together with the Si atom form a cyclic structure, said organic radicals being selected from divalent saturated aliphatic hydrocarbon radicals and the divalent saturated aliphatic organic radicals containing carbon and oxygen atoms in the ring structure; $OR^4$ radicals wherein $R^4$ is selected from hydrogen, alkyl radicals, substituted alkyl radicals; alkenyl radicals, aryl radicals, aralkyl radicals, alkaryl radicals, and cycloalkyl radicals; —$R^5OR^4$ radicals wherein $R^5$ is a divalent saturated aliphatic hydrocarbon radical or a divalent aromatic hydrocarbon radical; —$COOR^4$ radicals; —$OOCR^4$ radicals; —$R^5COOR^4$ radicals; —$R^5OOCR^4$ radicals; and polyether radicals.

4. The composition of claim 3 wherein said monovalent epoxy radical is represented by the general formula

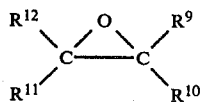

wherein:
(i) $R^9$, $R^{10}$, $R^{11}$ and $R^{12}$ are independently selected from the class consisting of hydrogen; alkyl radicals; substituted alkyl radicals; cycloalkyl radicals; alkenyl radicals; aryl radicals; aralkyl radicals; alkaryl radicals; $OR^{13}$ radicals wherein $R^{13}$ is selected from the class consisting of hydrogen, alkyl radicals, substituted alkyl radicals, alkenyl radicals, aryl radicals, aralkyl radicals, and alkaryl radicals; —$R^{14}OR^{13}$ radicals wherein $R^{14}$ is a divalent saturated aliphatic hydrocarbon radical or a divalent aromatic hydrocarbon radical; —$OOCR^{13}$ radicals; —$R^{14}OOCR^{13}$ radicals; —$COOR^{13}$ radicals; —$R^{14}COOR^{13}$ radicals; $OR^{15}$ radicals wherein $R^{15}$ is selected from the class consisting of oxirane ring containing monovalent saturated aliphatic hydrocarbon radicals and oxirane ring containing monovalent aliphatic-aromatic hydrocarbon radicals; —$OOCR^{15}$ radicals; —$COOR^{15}$ radicals; —$R^{14}OOCR^{15}$ radicals; and —$R^{14}COOR^{15}$ radicals; with the proviso that
(ii) one of $R^9$, $R^{10}$, $R^{11}$ or $R^{12}$ is selected from the class consisting of divalent saturated aliphatic hydrocarbon radicals; divalent aromatic hydrocarbon radicals; —$OR^{16}$— radicals wherein $R^{16}$ is selected from the class consisting of divalent saturated aliphatic hydrocarbon radicals and divalent aromatic hydrocarbon radicals; —$R^{14}OR^{16}$— radicals; —$R^{14}OOCR^{16}$— radicals; —$R^{14}COOR^{16}$— radicals; —$COOR^{16}$— radicals; and —$OOCR^{16}$— radicals.

5. The composition of claim 4 wherein:
(i) $R^9$, $R^{10}$, $R^{11}$ and $R^{12}$ are independently selected from the class consisting of hydrogen; alkyl radicals; substituted alkyl radicals; cycloalkyl radicals; aryl radicals; alkaryl radicals; araalkyl radicals; and $OR^{17}$ radicals wherein $R^{17}$ is selected from the class consisting of hydrogen, alkyl radicals, substituted alkyl radicals, aryl radicals, alkaryl radicals, and aralkyl radicals; with the proviso that
(ii) one of $R^9$, $R^{10}$, $R^{11}$ or $R^{12}$ is selected from the class consisting if divalent saturated aliphatic hydrocarbon radicals; divalent aromatic hydrocarbon radicals; $OR^{16}$— radicals; and —$R^{14}OR^{16}$— radicals.

6. The composition of claim 5 wherein $R^3$ is selected from hydrogen; alkyl radicals; hydroxyl; alkoxy radicals; aryl radicals; aryloxy radicals; alkaryl radicals; and aralkyl radicals.

7. The composition of claim 6 wherein said aromatic polyester-carbonate resin is derived from (a) a dihydric phenol, (b) at least one aromatic dicarboxylic acid or at least one reactive derivative thereof, and (c) a carbonate precursor.

8. The composition of claim 7 wherein said carbonate precursor is phosgene.

9. The composition of claim 8 wherein said aromatic dicarboxylic acid is selected from the class consisting of terephthalic acid, isophthalic acid, and mixtures thereof.

10. The composition of claim 8 wherein said reactive derivative of said aromatic dicarboxylic acid is selected from the class consisting of isophthloyl dichloride, terephthaloyl dichloride, and mixtures thereof.

11. The composition of claim 10 wherein said dihydric phenol is bisphenol A.

12. The composition of claim 11 wherein said epoxy silane is gamma-glycidoxypropyl-trimethoxysilane.

13. The composition of claim 6 which further contains an organophosphite color stabilizer.

14. The composition of claim 13 wherein said aromatic polyester-carbonate resin is derived from (a) a dihydric phenol, (b) at least one aromatic dicarboxylic acid or at least one reactive derivative thereof, and (c) a carbonate precursor.

15. The composition of claim 14 wherein said carbonate precursor is phosgene.

16. The composition of claim 15 wherein said aromatic dicarboxylic acid is selected from the class consisting of terephthalic acid, isophthalic acid, and mixtures thereof.

17. The composition of claim 15 wherein said reactive derivative of said aromatic dicarboxylic acid is selected from the class consisting of terephthaloyl dichloride, isophthaloyl dichloride, and mixtures thereof.

18. The composition of claim 17 wherein said dihydric phenol is bisphenol A.

19. The composition of claim 18 wherein said epoxy silane is gamma-glycidoxypropyl-trimethoxysilane.

20. The composition of claim 3 wherein said monovalent epoxy radical is represented by the general formula

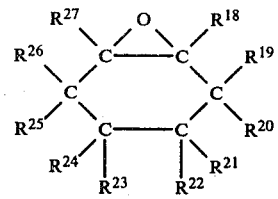

wherein:
(i) $R^{18}$ through $R^{27}$ are independently selected from hydrogen; alkyl radicals; substituted alkyl radicals;

alkenyl radicals; aryl radicals; aralkyl radicals; alkaryl radicals; $OR^{29}$ radicals wherein $R^{29}$ is selected from the class consisting of hydrogen, alkyl radicals, substituted alkyl radicals, alkenyl radicals, aryl radicals, alkaryl radicals, and aralkyl radicals; —$R^{30}OR^{29}$ radicals wherein $R^{30}$ is a divalent saturated aliphatic hydrocarbon radical or a divalent aromatic hydrocarbon radical; —$COOR^{29}$ radicals; —$OOCR^{29}$ radicals; —$R^{30}OOCR^{29}$ radicals; —$R^{30}OCOOR^{29}$ radicals; $OR^{31}$ radicals wherein $R^{31}$ is selected from the class consisting of oxirane ring containing saturated aliphatic hydrocarbon radicals and oxirane ring containing aliphatic-aromatic hydrocarbon radicals; —$R^{30}OR^{31}$ radicals; —$OOCR^{31}$ radicals; —$COOR^{31}$ radicals; —$R^{30}OOCR^{31}$ radicals; and —$R^{30}COOR^{31}$ radicals; with the proviso that (ii) one of $R^{18}$ through $R^{27}$ is selected from the class consisting of divalent saturated aliphatic hydrocarbon radicals; divalent aromatic hydrocarbon radicals; —$OR^{32}$— radicals wherein $R^{32}$ is selected from divalent saturated aliphatic hydrocarbon radicals and divalent aromatic hydrocarbon radicals; —$R^{30}OR^{32}$— radicals; —$OOCR^{32}$— radicals; —$COOR^{32}$— radicals; —$R^{30}OOCR^{32}$— radicals; and —$R^{30}COOR^{32}$— radicals.

21. The composition of claim 20 wherein:
(i) $R^{18}$ through $R^{27}$ are independently selected from hydrogen; alkyl radicals; substituted alkyl radicals; aryl radicals; aralkyl radicals; alkaryl radicals; and $OR^{28}$ radicals wherein $R^{28}$ is selected from the class consisting of hydrogen, alkyl radicals, substituted alkyl radicals, aryl radicals, alkaryl radicals, and aralkyl radicals; with the proviso that
(ii) one of $R^{18}$ through $R^{27}$ is selected from the class consisting of divalent saturated aliphatic hydrocarbon radicals; divalent aromatic hydrocarbon radicals; —$OR^{32}$— radicals; and —$R^{30}OR^{32}$ — radicals.

22. The composition of claim 21 wherein $R^3$ is selected from hydrogen; alkyl radicals; alkoxy radicals; hydroxyl; aryl radicals; aryloxy radicals; alkaryl radicals; and aralkyl radicals.

23. The composition of claim 22 wherein said aromatic polyester-carbonate resin is derived from (a) a dihydric phenol, (b) at least one aromatic dicarboxylic acid or at least one reactive derivative thereof, and (c) a carbonate precursor.

24. The composition of claim 23 wherein said carbonate precursor is phosgene.

25. The composition of claim 24 wherein said aromatic dicarboxylic acid is selected from the class consisting of terephthalic acid, isophthalic acid, and mixtures thereof.

26. The composition of claim 24 wherein said reactive derivative of said aromatic dicarboxylic acid is selected from the class consisting of isophthaloyl dichloride, terephthaloyl dichloride, and mixtures thereof.

27. The composition of claim 26 wherein said dihydric phenol is bisphenol A.

28. The composition of claim 27 wherein said epoxy silane is beta(3,4-epoxycyclohexyl)ethyltrimethoxysilane.

29. The composition of claim 22 which further contains a color stabilizing amount of an organophsopshite color stabilizer.

30. The composition of claim 29 wherein said aromatic polyester-carbonate resin is derived from (a) a dihydric phenol, (b) at least one aromatic dicarboxylic acid or at least one reactive derivative thereof, and (c) a carbonate precursor.

31. The composition of claim 30 wherein said carbonate precursor is phosgene.

32. The composition of claim 31 wherein said aromatic dicarboxylic acid is selected from the class consisting of terephthalic acid, isophthalic acid, and mixtures thereof.

33. The composition of claim 31 wherein said reactive derivative of said aromatic dicarboxylic acid is selected from the class consisting of isophthaloyl dichloride, terephthaloyl dichloride, and mixtures thereof.

34. The composition of claim 33 wherein said dihydric phenol is bisphenol A.

35. The composition of claim 34 wherein said epoxy silane is beta(3,4-epoxycyclohexyl)ethyltrimethoxysilane.

36. The composition of claim 2 wherein said epoxy siloxanes are represented by the general formula

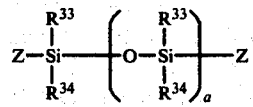

wherein:
(i) a is an integer having a value of from 1 to about 10;
(ii) $R^{33}$ and $R^{34}$ are independently selected from alkyl radicals, alkenyl radicals, alkoxy radicals, aryl radicals, aryloxy radicals, aralkyl radicals, alkaryl radicals, and hydrogem; and
(iii) each Z is independently selected from monovalent epoxy radicals.

37. The composition of claim 36 wherein said monovalent epoxy radical is represented by the general formula

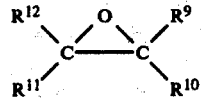

wherein:
(i) $R^9$, $R^{10}$, $R^{11}$ and $R^{12}$ are independently selected from the class consisting of hydrogen; alkyl radicals; substituted alkyl radicals; cycloalkyl radicals; alkenyl radicals; aryl radicals; aralkyl radicals; alkaryl radicals; $OR^{13}$ radicals wherein $R^{13}$ is selected from the class consisting of hydrogen, alkyl radicals, substituted alkyl radicals, alkenyl radicals, aryl radicals, aralkyl radicals, and alkaryl radicals; —$R^{14}OR^{13}$ radicals wherein $R^{14}$ is a divalent saturated aliphatic hydrocarbon radical or a divalent aromatic hydrocarbon radical; —$OOCR^{13}$ radicals; —$COOR^{13}$ radicals; —$R^{14}COOR^{13}$ radicals; —$R^{14}OOCR^{13}$ radicals; $OR^{15}$ radicals wherein $R^{15}$ is selected from the class consisting of oxirane ring containing monovalent saturated aliphatic hydrocarbon radicals and oxirane ring containing monovalent aliphatic-aromatic hydrocarbon radicals; —$OOCR^{15}$ radicals; —$COOR^{15}$ radicals; —$R^{14}OOCR^{15}$ radicals; and —$R^{14}COOR^{15}$ radicals; with the proviso that
(ii) one of $R^9$, $R^{10}$, $R^{11}$ or $R^{12}$ is selected from the class consisting of divalent saturated aliphatic hydrocarbon radicals; divalent aromatic hydrocarbon radicals; —OR$^{16}$— radicals wherein R$^{16}$ is selected from the class consisting of divalent saturated aliphatic hydrocarbon radicals and divalent aromatic hydrocarbon radicals; —R$^{14}$OR$^{16}$— radicals; —R$^{14}$OOCR$^{16}$— radicals; —R$^{14}$COOR$^{16}$— radicals; —COOR$^{16}$— radicals; and —OOCR$^{16}$— radicals.

38. The composition of claim 37 wherein:
(i) R$^9$, R$^{10}$, R$^{11}$ and R$^{12}$ are independently selected from the class consisting of hydrogen; alkyl radicals, substituted alkyl radicals, cycloalkyl radicals; aryl radicals; alkaryl radicals; aralkyl radicals; and OR$^{17}$ radicals wherein R$^{17}$ is selected from the class consisting of hydrogen, alkyl radicals, substituted alkyl radicals, aryl radicals, alkaryl radicals, and aralkyl radicals; with the proviso that
(ii) one of R$^9$, R$^{10}$, R$^{11}$ or R$^{12}$ is selected from the class consisting of divalent saturated aliphatic hydrocarbon radicals; divalent aromatic hydrocarbon radicals; OR$^{16}$— radicals; and —R$^{14}$OR$^{16}$— radicals.

39. The composition of claim 38 wherein said aromatic polyester-carbonate resin is derived from (a) a dihydric phenol, (b) at least one aromatic dicarboxylic acid or at least one reactive derivative of an aromatic dicarboxylic acid, and (c) a carbonate precursor.

40. The composition of claim 39 wherein said carbonate precursor is phosgene.

41. The composition of claim 40 wherein said aromatic dicarboxylic acid is selected from the class consisting of isophthalic acid, terephthalic acid, and mixtures thereof.

42. The composition of claim 40 wherein said reactive derivative of said aromatic dicarboxylic acid is selected from the class consisting of isophthaloyl dichloride, terephthaloyl dichloride, and mixtures thereof.

43. The composition of claim 42 wherein said dihydric phenol is bisphenol A.

44. The composition of claim 38 which further contains a color stabilizing amount of an organophosphite color stabilizer.

45. The composition of claim 44 wherein said aromatic polyester-carbonate resin is derived from (a) a dihydric phenol, (b) at least one aromatic dicarboxylic acid or at least one reactive derivative of an aromatic dicarboxylic acid, and (c) a carbonate precursor.

46. The composition of claim 45 wherein said carbonate precursor is phosgene.

47. The composition of claim 46 wherein said aromatic dicarboxylic acid is selected from the class consisting of isophthalic acid, terephthalic acid, and mixtures thereof.

48. The composition of claim 46 wherein said reactive derivative of said aromatic dicarboxylic acid is selected from the class consisting of isophthaloyl dichloride, terephthaloyl dichloride, and mixtures thereof.

49. The composition of claim 48 wherein said dihydric phenol is bisphenol A.

50. The composition of claim 36 wherein said monovalent epoxy radical is represented by the general formula

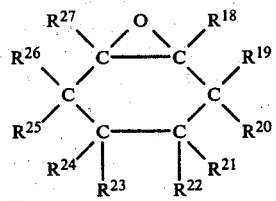

wherein:
(i) R$^{18}$ through R$^{27}$ are independently selected from hydrogen; alkyl radicals; substituted alkyl radicals; alkenyl radicals; aryl radicals; aralkyl radicals; alkaryl radicals; OR$^{29}$ radicals wherein R$^{29}$ is selected from the class consisting of hydrogen, alkyl radicals, substituted alkyl radicals, alkenyl radicals, aryl radicals, alkaryl radicals, and aralkyl radicals; —R$^{30}$OR$^{29}$ radicals wherein R$^{30}$ is a divalent saturated aliphatic hydrocarbon radical or a divalent aromatic hydrocarbon radical; —COOR$^{29}$ radicals; —OOCR$^{29}$ radicals; —R$^{30}$OOCR$^{29}$ radicals; —R$^3$OCOOR$^{29}$ radicals; OR$^{31}$ radicals wherein R$^{31}$ is selected from the class consisting of oxirane ring containing saturated aliphatic hydrocarbon radicals and oxirane ring containing aliphatic-aromatic hydrocarbon radicals; —R$^{30}$OR$^{31}$ radicals; —OOCR$^{31}$ radicals; —COOR—radicals; —R$^3$oOOCR$^{31}$ radicals; and —R$^{30}$COOR$^{31}$ radicals; with the proviso that
(ii) one of R$^{18}$ through R$^{27}$ is selected from the class consisting of divalent saturated aliphatic hydrocarbon radicals; divalent aromatic hydrocarbon radicals; —OR$^{32}$— radicals wherein R$^{32}$ is selected from divalent saturated aliphatic hydrocarbon radicals and divalent aromatic hydrocarbon radicals; —R$^{30}$OR$^{32}$— radicals; —OOCR$^{32}$— radicals; —COOR$^{32}$— radicals; —R$^{30}$OOCR$^{32}$— radicals; and —R$^{30}$COOR$^{32}$— radicals.

51. The composition of claim 50 wherein:
(i) R$^{18}$ through R$^{27}$ are independently selected from hydrogen; alkyl radicals; substituted alkyl radicals; aryl radicals; aralkyl radicals; alkaryl radicals; and OR$^{28}$ radicals wherein R$^{28}$ is selected from the class consisting of hydrogen, alkyl radicals, substituted alkyl radicals, aryl radicals, alkaryl radicals, and aralkyl radicals; with the proviso that
(ii) one of R$^{18}$ through R$^{27}$ is selected from the class consisting of divalent saturated aliphatic hydrocarbon radicals; divalent aromatic hydrocarbon radicals; —OR$^{32}$— radicals; and —R$^{30}$OR$^{32}$— radicals.

52. The composition of claim 51 wherein said aromatic polyester-carbonate resin is derived from (a) a dihydric phenol, (b) at least one aromatic dicarboxylic acid or at least one reactive derivative of said aromatic dicarboxylic acid, and (c) a carbonate precursor.

53. The composition of claim 52 wherein said carbonate precursor is phosgene.

54. The composition of claim 53 wherein said aromatic dicarboxylic acid is selected from the class consisting of isophthalic acid, terephthalic acid, and mixtures thereof.

55. The composition of claim 53 wherein said reactive derivative of said aromatic dicarboxylic acid is selected from the class consisting of isophthaloyl dichloride, terephthaloyl dichloride, and mixtures thereof.

56. The composition of claim 55 wherein said dihydric phenol is bisphenol A.

57. The composition of claim 51 which further contains a color stabilizing amount of an organophsophite color stabilizer.

58. The composition of claim 57 wherein said aromatic polyester-carbonate resin is derived from (a) a dihydric phenol, (b) at least one aromatic dicarboxylic acid or at least one reactive derivative of said aromatic dicarboxylic acid, and (c) a carbonate precursor.

59. The composition of claim 58 wherein said carbonate precursor is phosgene.

60. The composition of claim 59 wherein said aromatic dicarboxylic acid is selected from the class consisting of isophthalic acid, terephthalic acid, and mixtures thereof.

61. The composition of claim 60 wherein said reactive derivative of said aromatic dicarboxylic acid is selected from the class consisting of isophthaloyl dichloride, terephthaloyl dichloride, and mixtures thereof.

62. The composition of claim 61 wherein said dihydric phenol is bisphenol A.

63. The composition of claim 43 wherein said epoxy siloxane is bis(3-glycidoxypropyl)tetramethyldisiloxane.

64. The composition of claim 49 wherein said epoxy siloxane is bis(3-glycidoxypropyl)tetramethyldisiloxane.

65. A composition in accordance with claim 2 wherein a color stabilizing effective amount of an organophosphite is present.

* * * * *

UNITED STATES PATENT AND TRADEMARK OFFICE
CERTIFICATE OF CORRECTION

PATENT NO. : 4,393,156
DATED : July 12, 1983
INVENTOR(S) : Kenneth F. Miller

It is certified that error appears in the above–identified patent and that said Letters Patent are hereby corrected as shown below:

Column 20, line 28    -COOR-radicals;

should be $-COOR^{31}$ radicals;

Signed and Sealed this

Eighteenth Day of June 1985

[SEAL]

*Attest:*

DONALD J. QUIGG

*Attesting Officer*     *Acting Commissioner of Patents and Trademarks*